(12) United States Patent
Graf

(10) Patent No.: US 6,280,560 B1
(45) Date of Patent: Aug. 28, 2001

(54) METHOD AND PLANT FOR PRODUCING ENDLESS LAMINATED VENEER BOARDS

(75) Inventor: Matthias Graf, Eppingen (DE)

(73) Assignee: Maschinenfabrik J. Dieffenbacher GmbH & Co. (DE)

( * ) Notice: Subject to any disclaimer, the term of this patent is extended or adjusted under 35 U.S.C. 154(b) by 0 days.

(21) Appl. No.: 09/417,760

(22) Filed: Oct. 14, 1999

(30) Foreign Application Priority Data

Oct. 14, 1998 (DE) ................................ 198 47 345

(51) Int. Cl.$^7$ ............................ B32B 31/00; B65H 29/66
(52) U.S. Cl. .................... 156/299; 156/264; 156/556; 156/558; 156/559; 156/563; 156/566
(58) Field of Search .................... 156/563, 559, 156/558, 556, 566, 299, 304.1, 204

(56) References Cited

U.S. PATENT DOCUMENTS

| 3,841,945 | 10/1974 | Troutner et al. ............. 156/538 |
| 3,963,552 | 6/1976 | Troutner et al. ............. 156/299 |
| 4,316,758 | * 2/1982 | Suzuki et al. ............... 156/563 |
| 5,895,546 | 4/1999 | Bielfeldt et al. ............ 156/304.1 |
| 5,942,079 | 8/1999 | Bielfeldt .................... 156/379.8 |

FOREIGN PATENT DOCUMENTS

| 2 318 284 | 12/1973 | (DE) . |
| 196 27 024 A1 | 1/1998 | (DE) . |

* cited by examiner

*Primary Examiner*—Michael W. Ball
*Assistant Examiner*—Todd J. Kilkenny
(74) *Attorney, Agent, or Firm*—Foley & Lardner

(57) ABSTRACT

The invention relates to a method and a plant for assembling, gluing and pressing veneer panels to be connected in a plurality of layers one above the other and one behind the other to form an endless strand of laminated veneer boards forming a continuous veneer-panel strand. The plant has a glue application machine, rolling belts, a laying device and a continuously operating press. A veneer-panel laying and interlinking device has a buffer acceleration belt with a combined reversing action. The laying device has a veneer-assembly laying belt and is embodied as a recirculating chain device with a recirculating supporting surface to form a fall-through gap, which can be moved forward and backward and raised and lowered for the front or rear veneer-panel edge and can be adjusted to the respective deposition and interleaving position on the veneer-assembly laying belt.

6 Claims, 5 Drawing Sheets

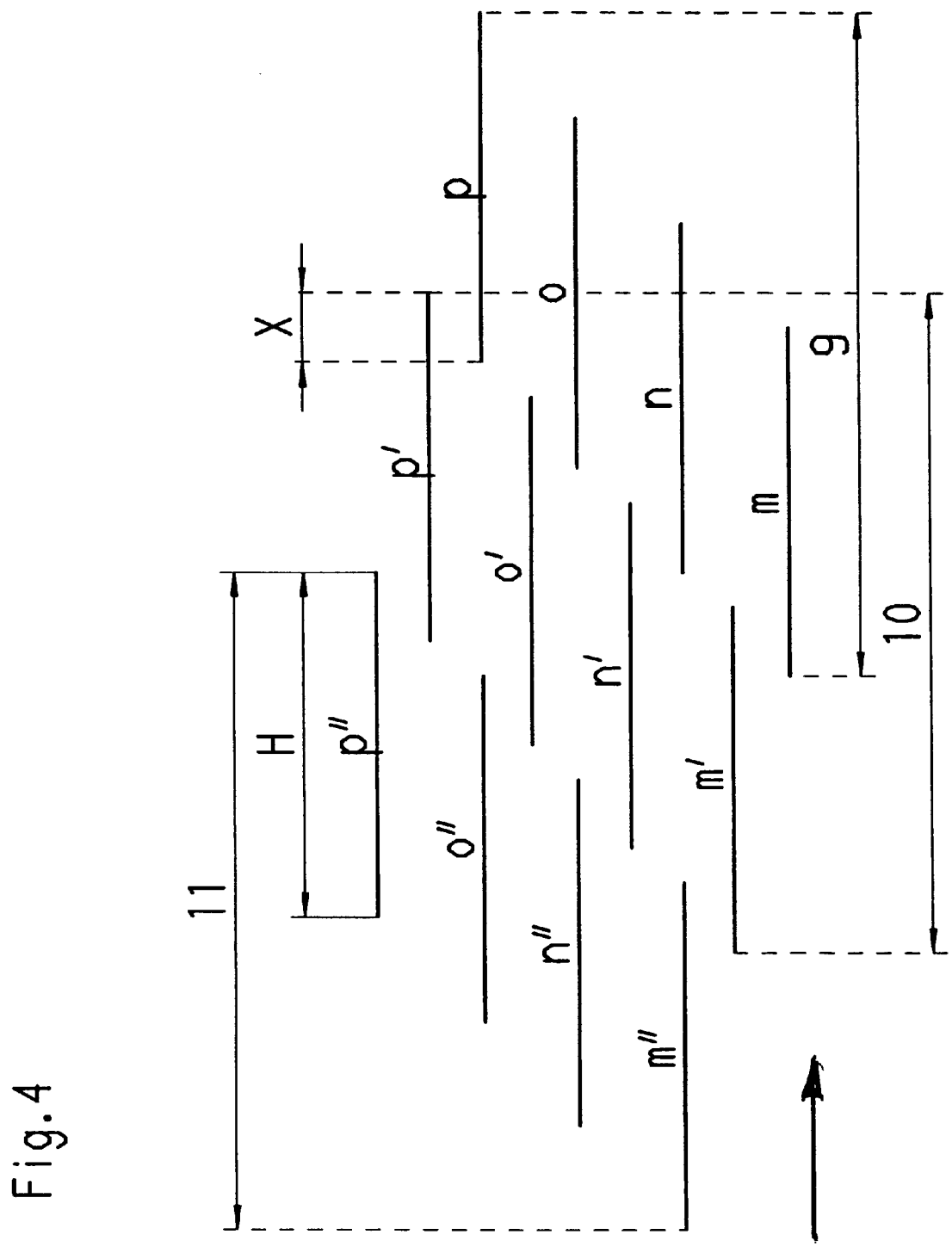

Figure 1:
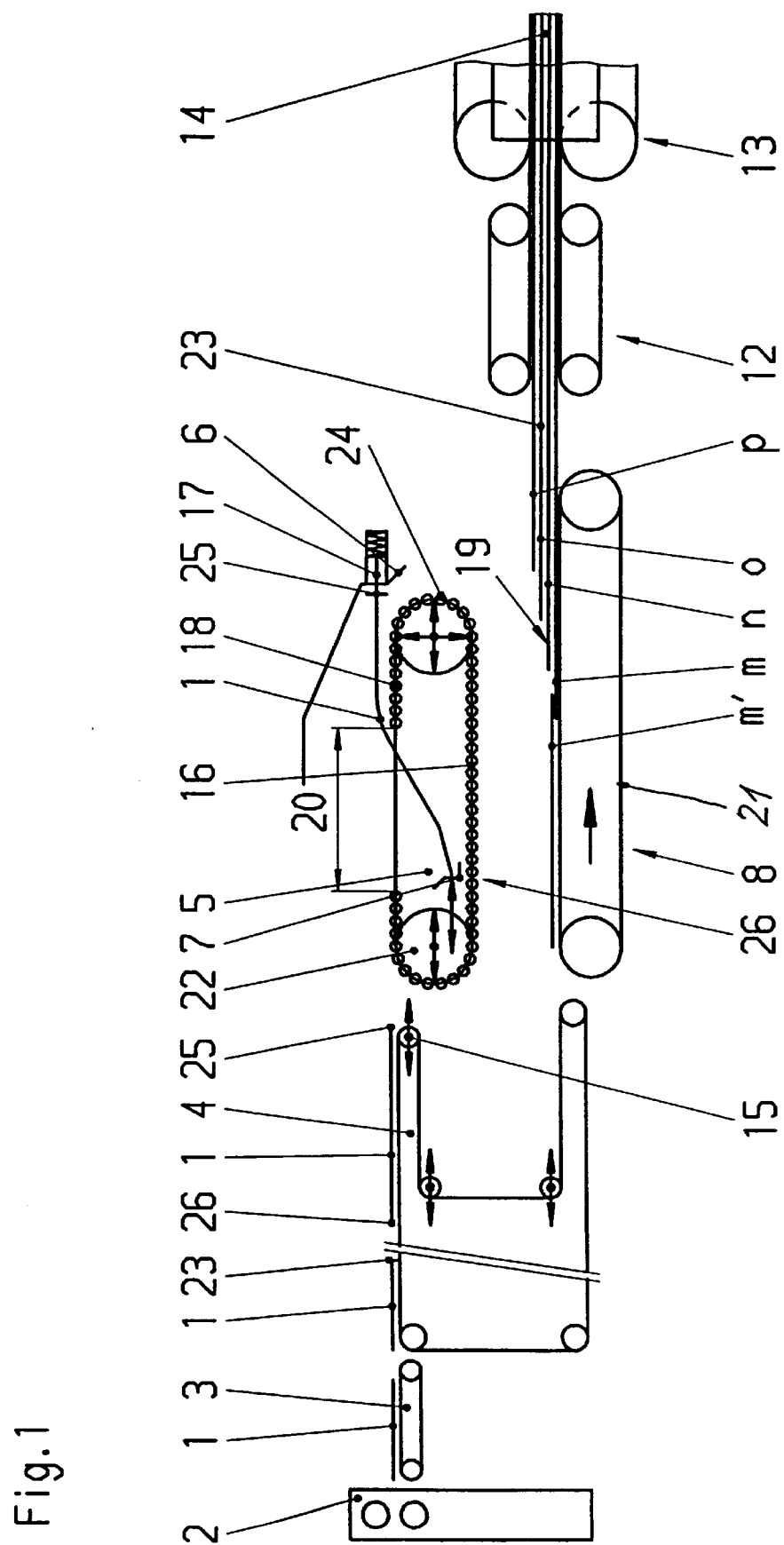

METHOD AND PLANT FOR PRODUCING ENDLESS LAMINATED VENEER BOARDS

BACKGROUND OF THE INVENTION

The invention relates to a method and plant for producing endless laminated veneer boards.

A method of this kind is disclosed by German Offenlegungsschrift 196 27 024. This method is based on the object of automatically and continuously assembling assemblies of layers of large-area veneer panels (or sheets) to give adequate mechanical interlinking, with the result that, given the subsequent continuous pressing operation, these veneer-assembly transitions have virtually the same physical strength properties in the finished laminated veneer boards, as the laminated veneer boards produced in accordance with the previous laminated veneer assemblies joined together in a sandwich construction. With this method, it is possible to produce laminate veneer boards of good quality if all the manufacturing and production parameters are matched to one another in an optimum manner and the plant operates accordingly. One disadvantage of this method is the high proportion of the costs accounted for by the plant.

According to another method that has been disclosed, the veneer panels are deposited in the appropriate laying position by means of a rolling belt. Here, the veneer panels are first of all moved into the deposition position by means of the rolling belt and are then unloaded as the belt projection moves back, as a result of which the veneer panel falls onto the conveyor belt or veneer assembly underneath it.

For a complete deposition cycle comprising the following steps:

a) taking over veneer panel onto a rolling belt,
b) moving veneer panel into a deposition position and
c) unloading and depositing veneer panel during return movement, it was previously possible to achieve cycle times of 5 s per veneer panel.

However, industrial-scale LVL production plants with a production capacity of about 250 m$^3$ per day must achieve cycle times of at least 2.5 s per veneer panel in order to keep up with the competition. For this reason, the laying operation in the laying stations is carried out on two levels to enable the required 24 veneer panels per minute to be achieved at a laying cycle of 5 s per veneer panel per level.

However, one disadvantage of these multi-level laying stations is that the laid veneer assemblies from the two levels must then be combined to give a veneer-panel strand. This necessarily requires sloping conveyor belts and corresponding kinks. At the transition from the horizontal to the slope and vice versa, stretching and compression effects occur which deform the veneer-panel strand or displace the veneer panels relative to one another. Since the veneer panels are already glued at this point in time, the displacements and deformations occur at undefined locations and lead to a change in the lengths of overlap between the veneer panels. The length of overlap must not fall below a minimum length in order to achieve the required bending strengths in the finished boards. Accordingly, any overlap tolerances must be compensated for by increasing the length of overlap and this results in a commercial disadvantage due to increased use of material.

The large number of drive elements in these plants also entails considerable susceptibility to faults, which impairs the availability of the overall production line.

SUMMARY OF THE INVENTION

An object of the present invention is to continuously produce good quality laminated veneer boards at a high throughput rate.

Another object of the present invention is to create a plant with an overall simple construction having fewer subassemblies and components in order to reduce plant costs.

According to one embodiment of the invention, in a continuous process, each veneer panel is passed through a glue application machine at a high speed equal to the operating and pressing speed, but in the process the veneer board is provided with a layer of glue only on its upper side. The application of glue ceasing in each case at the veneer panel intended as the covering layer. The veneer panels are then transferred from the glue application machine to a buffer acceleration belt with a higher speed and an accelerating reversing transfer projection. The veneer panel is transferred from the transfer projection to a supporting surface of a horizontally reversing laying device that can also be raised and lowered. The supporting surface circulates via two rollers, and the veneer panel is hence moved into the predetermined deposition position, while being guided on the upper level by its front edge until it reaches a first stop, where it stops, by means of an endless recirculating chain device which takes the supporting surface along. The supporting surface forms part of the recirculating-chain section with a second part that forms a fall-through gap for the veneer panel. After the veneer panel stops, the supporting surface then continues to run underneath it and releases the rear edge of the veneer panel. The veneer panel falls, rear edge first, through the fall-through gap into a second stop on the lower level of the recirculating chain device and hence also onto the supporting surface, which is now returning underneath it counter to the feed direction. After release from the second stop and by virtue of the supporting surface, which continues to run underneath it, the veneer panel falls front edge first onto a veneer-assembly laying belt running at the operating speed at the deposition position predetermined for it in accordance with the laying sequence and having the forward stepping effect as shown in FIG. 4. The subsequent veneer panels are assembled to give a veneer assembly, in each case with a veneer overlap x with a forward stepping effect, by repeating the preceding steps which are synchronized and coordinated in terms of time, to the appropriately input traversing positions of the transfer projection of the buffer acceleration belt and of the laying device in the horizontal and vertical direction. A plurality of veneer assemblies is assembled one behind the other to give a veneer-panel strand by repeating the preceding method steps. The veneer-panel strand formed in this way is passed at operating speed from the veneer-assembly laying belt into a heated, continuously operating press for pressing and gluing.

Figure 5:
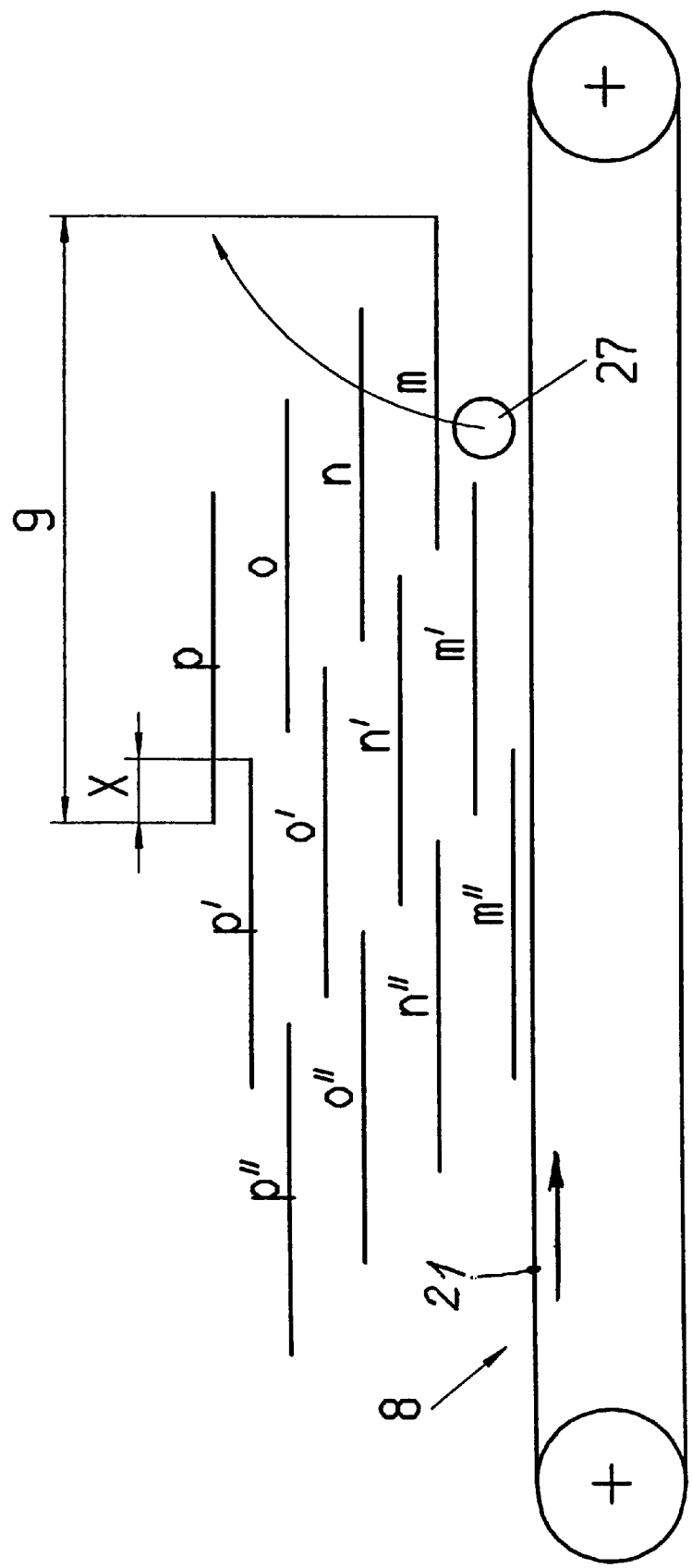

According to a second embodiment of the invention, in a continuous process, each veneer panel is passed through a glue application machine a high speed equal to the operating and pressing speed, being in the process provided with a layer of glue only on its upper side, the application of glue ceasing in each case at the veneer panel intended as the covering layer. The veneer panel is then transferred from the glue application machine to a buffer acceleration belt with a higher speed and an accelerating reversing transfer projection. The veneer panel is transferred from the transfer projection to a supporting surface of a laying device that can be raised and lowered, the supporting surface circulating via two rollers, and is hence moved into the predetermined deposition position, in the process being guided on the upper level by its front edge until it reaches a first stop, where it stops, by means of an endless recirculating chain device which takes the supporting surface along, the supporting surface forming part of the recirculating-chain section and the second part forming a fall-through gap for the veneer panel. After the veneer panel stops, the supporting surface continues to run underneath it and releases the rear edge of the veneer panel, which falls, rear edge first, through the fall-through gap into a second stop on the lower level of the recirculating chain device and hence also onto the supporting surface, which is now returning underneath it counter to the feed direction. After release from the second stop and by virtue of the supporting surface which continues to run underneath it, the veneer panel falls front edge first onto a veneer-assembly laying belt running at the operating speed at the deposition position predetermined for it in accordance with the laying sequence and having the rearward stepping effect, as shown in FIG. 5. The successive veneer panels are assembled to give a veneer assembly, in each case with a veneer overlap x with a rearward stepping effect, by repeating the preceding method steps, which are synchronized and coordinated in terms of time, and by appropriately input traversing positions of the transfer projection of the buffer acceleration belt and of the laying device in the vertical direction, and a plurality of veneer assemblies is assembled one behind the other to give a veneer-panel strand by repeating these method steps, the preceding veneer assembly in each case being raised and placed on the following assembly with a veneer overlap x. The veneer-panel strand formed in accordance with these method steps is passed at operating speed from the veneer-assembly laying belt into a heated, continuously operating press for pressing and gluing.

In the case of a number of veneer panels, it may be expedient, in accordance with the type of wood, for the veneer-panel strand to pass through and be preheated in a continuously operating preliminary press before the continuously operating press.

The plant includes a glue application machine, rolling belts, a veneer-panel laying device and a continuously operating press. A veneer-panel laying and interlinking device includes a buffer acceleration belt with a combined reversing action, a laying device with a veneer-assembly laying belt. The laying device includes a recirculating chain with a recirculating supporting surface and forms a fall-through gap, which can be moved forward and backward and raised and lowered for the front or rear veneer-panel edge. The gap can be adjusted to the respective deposition and interleaving position on the veneer-assembly laying belt.

The veneer-panel laying and interlinking device also includes a transfer belt. The fall-through gap may be horizontally stationary and may be raised and lowered vertically for the front and rear veneer-panel edges and can be deposited on the veneer-assembly laying belt at the respective deposition position.

With the method and the plants according to the invention, it is possible to achieve the required laying cycle of 2.5 s per veneer panel on one level, this making itself evident in lower investment costs for the overall plant. It is particularly significant here that the recirculating chain device can circulate at a constant speed and that, as a result, it is not necessary to accelerate and brake any masses. Another advantage compared with the prior art is without doubt the smaller number of drive elements and of moving parts and other structures, thereby improving availability because of reduced susceptibility to faults and hence improving the overall availability index of the large plant. Greater economy in production is furthermore achieved by virtue of the fact that there is no need to compensate for any overlap tolerances because the laying device according to the invention ensures accurate laying positions of the veneer panels.

Further advantageous features and refinements of the subject matter of the invention will emerge from the following description together with the drawings.

BRIEF DESCRIPTIONS OF THE DRAWINGS

Figure 2:
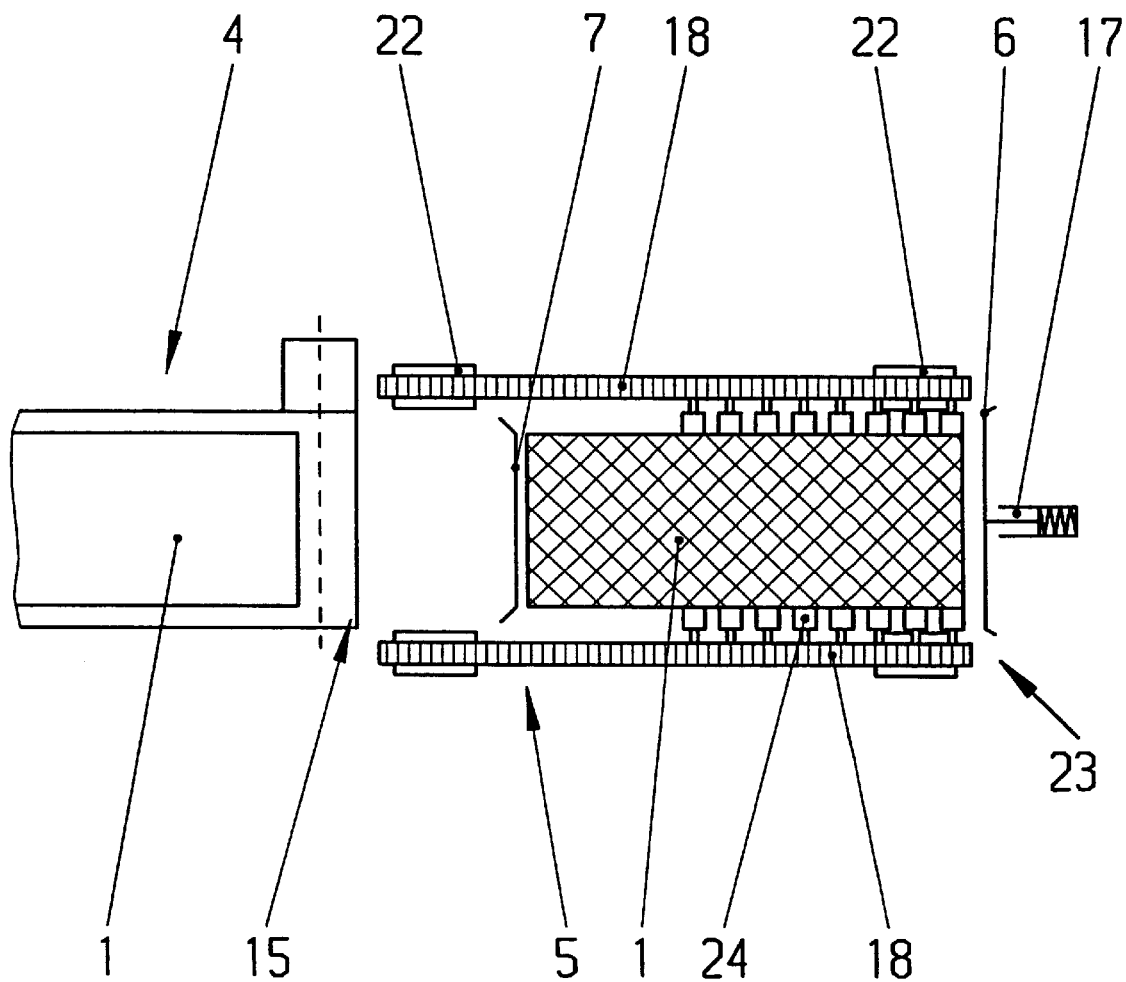

FIG. 1 shows a side view of the plant according to the invention for carrying out the method in accordance with the invention, FIG. 2 shows a plan view of the laying device shown in FIG. 1, FIGS. 3a to 3c show the laying device in FIG. 1 in three stages of the sequence during the deposition of a veneer panel, FIG. 4 shows the veneer-panel structure with a veneer-panel overlap x with forward stepping, and FIG. 5 shows the veneer-panel structure with a veneer-panel overlap x with rearward stepping.

DETAILED DESCRIPTION OF PREFERRED EMBODIMENTS

FIG. 1 is an overall schematic view of the plant according to the invention for carrying out the method in accordance with the invention for the first embodiment example.

During the laying operation, the veneer panels 1 run through the glue application machine 2 at high speed and are fed to the transfer belt 3, only the upper side of the veneer panel 1 being glued in each case, thereby allowing good transportability on the belts and roller tables through the entire plant section. As shown in FIGS. 4 and 5, only the uppermost veneer panel p of a veneer assembly 9, 10 or 11 or of the veneer-panel strand 23 is not glued. Adhesion is in each case ensured by gluing the veneer panel o underneath. The layer structure of a strand is recorded numerically as it passes through the individual devices by correspondingly counting the veneer panels 1 as they are fed to the glue application machine 2, i.e. by recording them numerically.

The main parts of the plant are a glue application machine 2, a transfer belt 3, a laying device 5, a continuously operating press 13 and a heated preliminary press 12 which may be arranged ahead of the continuously operating press 13. For the first embodiment example, the veneer-panel laying and interlinking device is made up of a buffer acceleration belt 4 with a combined reversing action, a laying device 5 and a veneer-assembly laying belt 8, the laying device 5 being designed as a recirculating chain device 18 with a recirculating supporting surface 16 and forming a fall-through gap 20, which can be moved forward and backward and raised and lowered for the front or rear veneer-panel edge 25, 26 to adjust it to the respective deposition and interleaving position 19 on the veneer-assembly laying belt 8. The supporting surface 16 of the laying device 5 is preferably embodied as a roller carpet with rollers 24. However, it is also possible for it to be embodied with a smooth surface which is mounted in chains of a recirculating chain device 18. A fabric belt can also be used as the supporting surface 16 and be provided with a cut-out fall-through gap 20.

For the second embodiment, the plant is of almost identical construction, except that the laying device 5 is embodied in such a way as to be horizontally stationary and capable of being raised and lowered vertically and that the laying operation takes place with a rearward stepping effect on the veneer-assembly laying belt 8. The fall-through gap 20 is formed over a length which allows the laid veneer assembly 9, 10 and 11 to be lifted out upward with a lifting roller or rod 27 once the covering veneer panel p has been deposited and thus makes it possible for the laying operation to be continued with the lowermost veneer panel m'. As the advancing veneer assembly is deposited, the lifting roller 27 must be removed at the side, and a new lifting roller 27 must be installed at the beginning on the veneer-assembly laying belt 8 at the beginning of the next laying operation. For this purpose, the lifting rollers 27 can likewise be guided on the veneer-assembly laying belt 8 in such a way as to circulate and raise.

Figure 3A:
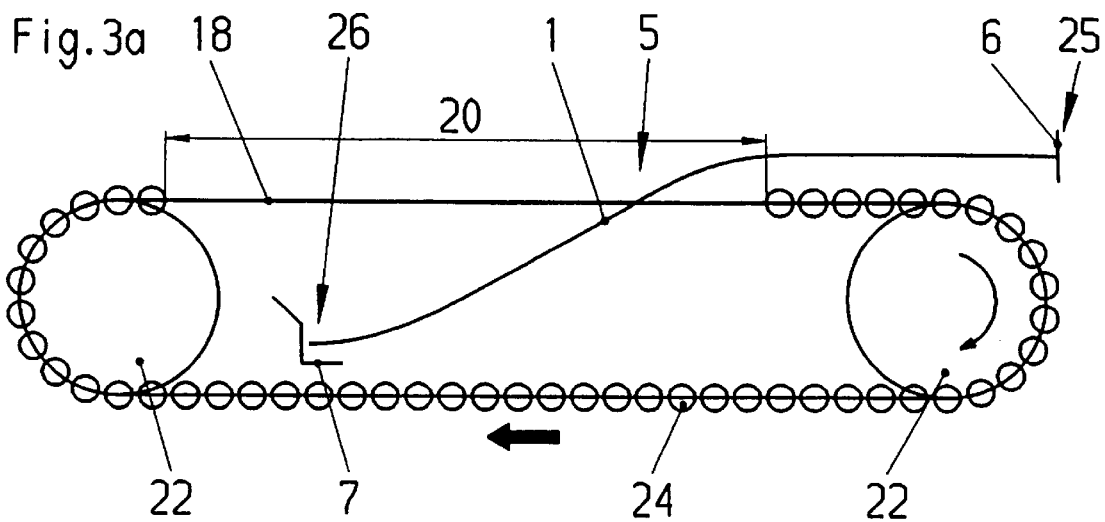
Figure 3B:
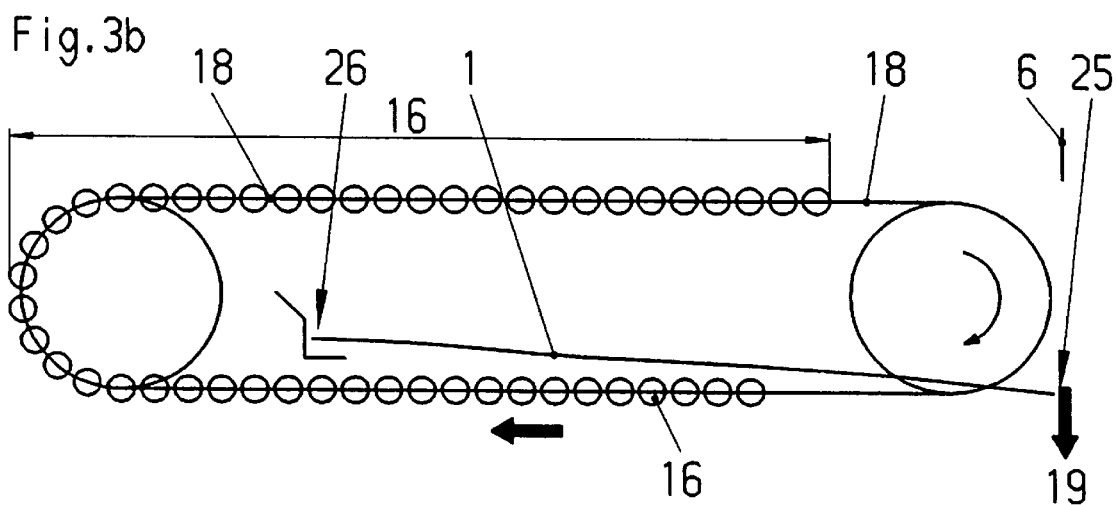
Figure 3C:
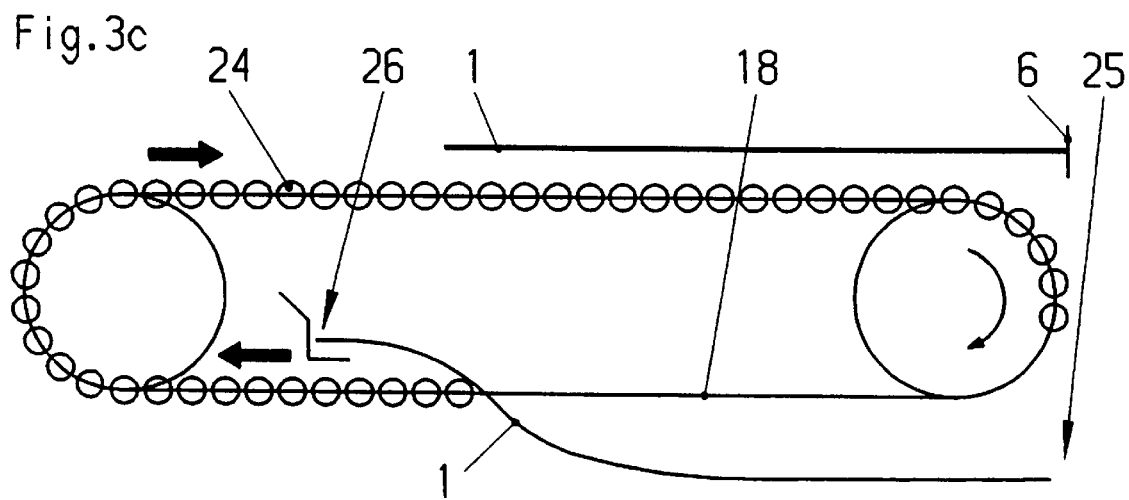

As illustrated in FIGS. 1, 2 and 3a to 3c, the veneer panel 1 is taken over by the buffer acceleration belt 4 and transferred by means of its transfer projection 15 to the laying device 5, which is designed as a recirculating chain device 18. The outer chain sprockets 22 move a supporting surface 16 which has a fall-through gap 20 for the veneer-panel length. The veneer panel 1 is transported forward with the supporting surface 16, which is fitted up to the stop 6 with dampers 17, and then comes to a halt against it, while the supporting surface 16 continues to run underneath it, is deflected by a chain sprocket 22 and runs on backward at the lower level counter to the feed direction. The veneer panel 1 now falls downward from the upper level through the fall-through gap 20, first with its rear edge 26, into a second stop 7 and hence also onto the supporting surface 16 running backward, as shown in FIG. 3a. After the supporting surface 16 runs under the veneer panel 1 in the course of its constant progress, the veneer panel now falls with its front edge 25 first onto the veneer-assembly laying belt 8 at its allotted deposition position 19, as shown in FIG. 3b. Once the supporting surface 16 has passed the lower stop 7, the stop 7 is retracted pneumatically and the veneer panel 1 is completely released for deposition on the veneer-assembly laying belt 8. After reversal via the second chain sprocket 22, the supporting surface 16 can then take over the next veneer panel 1 on the upper level and be moved with the laying device 5 to the next deposition position 19 of the veneer-assembly laying belt 8. The laying device 5 will have to adopt this deposition position four times, with a forward stepping and raising effect in accordance with the first embodiment example, before a veneer assembly 9, 10 or 11 has been assembled. During laying, the laying device 5 continuously and synchronously accompanies the veneer-assembly laying belt 8 to the continuously operating press 13 at press speed.

According to the second embodiment example, the respective deposition position 19 is adopted four times with a rearward stepping and raising effect of the now stationary laying device 5 by the forward movement of the laying belt 21 of the veneer-assembly laying belt 8 to give a veneer assembly with four layers.

During laying, the stop 7 travels forward continuously and synchronously with the veneer-assembly laying belt 8 and the continuously operating press 13 and then backward into its initial position. Another embodiment could consist in the entire laying device 5 being designed to be capable of horizontal movement for the laying operation. The continuous pressing of the veneer-panel strand 23 in the continuously operating press 13 gives an endless laminated veneer board 14.

FIG. 4 shows the interlinked structure of the veneer panels 1 to form a plurality of veneer assemblies 9, 10 and 11 and a veneer-panel strand 23 for the first embodiment example, with a forward stepping effect, and FIG. 5 shows it for the second embodiment example, with a rearward stepping effect, after being assembled the individual veneer panels 1 being stuck together mechanically by the veneer overlap x to give the corresponding veneer panels m, n, o, p of a veneer assembly 9, 10 or 11. Here, the constant operating speed and identical geometrical positions of veneer-panel length H and veneer-panel overlap x result always in the same situation of the veneer assembly, i.e. the fixing of the veneer panels 1 relative to one another in the assembly strand.

In a preferred embodiment, a process for assembling, gluing and pressing veneer panels to be connected in a plurality of layers one above the other and one behind the other to form an endless strand of laminated veneer boards is characterized by the following steps:

1.1 in a continuous process, each veneer panel is passed through a glue application machine at a high speed equal to the operating and pressing speed, but in the process is provided with a layer of glue only on its upper side, the application of glue ceasing in each case at the veneer panel intended as the covering layer;

1.2 transfer of the veneer panel from the glue application machine to a buffer acceleration belt with a higher speed and an accelerating reversing transfer projection;

1.3 the veneer panel is transferred from the transfer projection to a supporting surface of a horizontally reversing laying device that can also be raised and lowered, said supporting surface circulating via two rollers, and is hence moved into the predetermined deposition position, in the process being guided on the upper level by its front edge until it reaches a first stop, where it stops, by means of an endless recirculating chain device which takes the supporting surface along, the supporting surface forming part of the recirculating-chain section and the second part forming a fall-through gap for the veneer panel;

1.4 after the veneer panel stops, the supporting surface continues to run underneath it and releases the rear edge of the veneer panel, which falls, rear edge first, through the fall-through gap into a second stop on the lower level of the recirculating chain device and hence also onto the supporting surface, which is now returning underneath it counter to the feed direction;

1.5 after release from the second stop and by virtue of the supporting surface, which continues to run underneath it, the veneer panel falls front edge first onto a veneer-assembly laying belt running at the operating speed at the deposition position predetermined for it in accordance with the laying sequence and having the forward stepping effect;

1.6 the subsequent veneer panels are assembled to give a veneer assembly, in each case with a veneer overlap x with a forward stepping effect, by repeating the method steps described in 1.1 to 1.5, which are synchronized and coordinated in terms of time, and by appropriately input traversing positions of the transfer projection of the buffer acceleration belt and of the laying device in the horizontal and vertical direction, and a plurality of veneer assemblies is assembled one behind the other to give a veneer-panel strand by repeating method steps 1.1 to 1.5; and 1.7 the veneer-panel strand formed in accordance with method steps 1.1 to 1.6 is passed at operating speed from the veneer-assembly laying belt into a heated, continuously operating press for pressing and gluing.

In another embodiment, a process for assembling, gluing and pressing veneer panels to be connected one above the other and one behind the other in a plurality of layers to give an endless strand of laminated veneer boards is characterized by the following steps:

2.1 in a continuous process, each veneer panel is passed through a glue application machine at a high speed equal to the operating and pressing speed, in the process being provided with a layer of glue only on its upper side, the application of glue ceasing in each case at the veneer panel intended as the covering layer;

2.2 transfer of the veneer panel from the glue application machine to a buffer acceleration belt with a higher speed and an accelerating reversing transfer projection;

2.3 the veneer panel is transferred from the transfer projection to a supporting surface of a laying device that can be raised and lowered, said supporting surface circulating via two rollers, and is hence moved into the predetermined deposition position, in the process being guided on the upper level by its front edge until it reaches a first stop, where it stops, by means of an endless recirculating chain device which takes the supporting surface along, the supporting surface forming part of the recirculating-chain section and the second part forming a fall-through gap for the veneer panel;

2.4 after the veneer panel stops, the supporting surface continues to run underneath it and releases the rear edge of the veneer panel, which falls, rear edge first, through the fall-through gap into a second stop on the lower level of the recirculating chain device and hence also onto the supporting surface, which is now returning underneath it counter to the feed direction;

2.5 after release from the second stop and by virtue of the supporting surface, which continues to run underneath it, the veneer panel falls front edge first onto a veneer-assembly laying belt running at the operating speed at the deposition position predetermined for it in accordance with the laying sequence and having the rearward stepping effect;

2.6 the successive veneer panels are assembled to give a veneer assembly, in each case with a veneer overlap x with a rearward stepping effect, by repeating the method steps 2.1 to 2.5, which are synchronized and coordinated in terms of time, and by appropriately input traversing positions of the transfer projection of the buffer acceleration belt and of the laying device in the vertical direction, and a plurality of veneer assemblies is assembled one behind the other to give a veneer-panel strand by repeating method steps 2.1 to 2.5, the preceding veneer assembly in each case being raised and placed on the following assembly with a veneer overlap x; and 2.7 the veneer-panel strand formed in accordance with method steps 2.1 to 2.6 is passed at operating speed from the veneer-assembly laying belt into a heated, continuously operating press for pressing and gluing.

A plant for carrying out the process of the preferred embodiment includes a glue application machine, rolling belts, a laying device and a continuously operating press, characterized in that the veneer-panel laying and interlinking device comprises a buffer acceleration belt (4) with a combined reversing action, a laying device (5) with a veneer-assembly laying belt (8), the laying device (5) being embodied as a recirculating chain device (18) with a recirculating supporting surface (16) to form a fall-through gap (20), which can be moved forward and backward and raised and lowered for the front or rear veneer-panel edge (25 and 26) and can be adjusted to the respective deposition and interleaving position (19) on the veneer-assembly laying belt (8).

A plant for carrying out the process of the alternative embodiment includes a glue application machine, rolling belts, a laying device and a continuously operating press, characterized in that the veneer-panel laying and interlinking device comprises a transfer belt (3) and a laying device (5) with a veneer-assembly laying belt (8), the laying device (5) being embodied as a recirculating chain device (18) with a recirculating supporting surface (16) and forming a fall-through gap (20), which is horizontally stationary and can be raised and lowered vertically for the front and rear veneer-panel edges (25, 26) and can be deposited on the veneer-assembly laying belt (8) at the respective deposition position (19).

Further, the supporting surface (16) of the laying device (5) may be embodied with rollers (24) as a roller carpet or a smooth surface which is supported in chains of a recirculating chain device (18). A further alternative includes the use of a fabric belt with a cut-out fall-through gap (20) is used as the supporting surface (16). The fall-through gap (20) may be formed over a length which allows the laid veneer assembly (9 or 10 or 11) to be lifted out upward after the deposition of the respective covering veneer panel (p, p', p", . . . ), and the laying operation can thus be continued with the lowermost veneer panel (m, m', m", . . . ), it being possible in each case for the raised veneer assembly (9 or 10 or 11) to be lowered onto the newly laid veneer assembly. A stop (7) is arranged within the laying device (5) in such a way that it can be moved horizontally and, during the deposition operation, it can be moved forward and then backward into its initial position in synchronism with the veneer-assembly laying belt (8) and the continuously operating press (13). The entire laying device (5) is designed in such a way that it can be moved horizontally for the deposition operation. Further, the process of the plant may be characterized in that, ahead of the continuously operating press (13), the veneer-panel strand passes through a continuously operating preliminary press (12) and is preheated in the latter.

Additional advantages and modifications will readily appear to those skilled in the art. The invention, therefore, is not limited to the specific details and representative devices shown and described herein. Accordingly, various modifications may be made without departing from the scope of the invention.

The priority document here, German application 198 47 345.1 filed Oct. 14, 1998, is hereby incorporated by reference.

What is claimed is:

1. A method for assembling, gluing and pressing veneer panels into a plurality of layers, one panel behind another panel, forming a continuous strand of laminated veneer panels, comprising the steps of:

(a) conveying, at a speed equal to an operating and pressing speed, a veneer panel through a glue application machine and providing an uppermost surface of the veneer panel with a layer of glue;

(b) transferring the veneer panel from the glue application machine to a buffer acceleration belt including a transfer projection;

(c) transferring the veneer panel from the transfer projection to a supporting surface of a laying device, the supporting surface moving via a re-circulating chain device and circulating via two rollers into a predetermined deposition, while the veneer panel is guided on an upper level of the laying device by a front edge;

(d) stopping the veneer panel at the front edge by contacting a first stop, while the supporting surface continues to circulate underneath the veneer panel by the re-circulating chain, the re-circulating chain including the supporting surface and a fall-through gap;

(e) releasing a rear edge of the veneer panel causing the rear edge to fall through the fall-through gap into a second stop on a lower level of the re-circulating chain device onto the supporting surface, while the supporting surface moves underneath the veneer panel in a counter direction;

(f) releasing the veneer panel from a second stop by continuous circulation of the supporting surface causing the front edge of the veneer panel to fall onto a veneer-assembly laying belt, while the veneer-assembly laying belt moves at the operating speed to the predetermined deposition position;

(g) repeating steps (a) through (f) for a plurality of veneer panels to assemble the veneer panels with an overlap thus forming a veneer assembly and assembling each of the veneer assemblies, one veneer assembly behind another veneer assembly forming a veneer panel strand; and (h) transferring the veneer panel strand, at the operating speed, from the veneer-assembly laying belt into a heated continuously operating press for pressing and gluing the veneer panel strand.

2. The method of claim 1, wherein the veneer assembly laying belt moves at the operating speed to the predetermined deposition position according to a laying sequence and having a forward stepping effect.

3. The method of claim 2, wherein the veneer overlap includes the forward stepping effect in which the veneer panels are synchronized and co-ordinated in terms of time and by input of traversing positions of the transfer projection and the laying device in a horizontal and vertical direction.

4. The method of claim 1, wherein the veneer assembly laying belt moves at the operating speed to the predetermined deposition position according to a laying sequence and having a rearward stepping effect.

5. The method of claim 4, wherein the veneer overlap includes the rearward stepping effect in which the veneer panels are synchronized and co-ordinated in terms of time and by input of traversing positions of the transfer projection and the laying device in a vertical direction.

6. The method of claim 1, wherein the veneer panel strand is heated at a continuously operating preliminary press then passed to the continuously operating press.

* * * * *